US012596991B2

(12) United States Patent
Manzano et al.

(10) Patent No.: US 12,596,991 B2
(45) Date of Patent: Apr. 7, 2026

(54) NO-CODE GENERATION OF INTEGRATION APPLICATIONS

(71) Applicant: Salesforce, Inc., San Francisco, CA (US)

(72) Inventors: Ignacio Manzano, Buenos Aires (AR); Diego Larralde, Buenos Aires (AR); Tomas Fernandez Martinez, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 222 days.

(21) Appl. No.: 18/207,291

(22) Filed: Jun. 8, 2023

(65) Prior Publication Data

US 2024/0412157 A1     Dec. 12, 2024

(51) Int. Cl.
| | |
|---|---|
| *G06F 16/2452* | (2019.01) |
| *G06F 8/61* | (2018.01) |
| *G06F 9/54* | (2006.01) |
| *G06F 16/2453* | (2019.01) |
| *G06Q 10/087* | (2023.01) |
| *G06F 11/34* | (2006.01) |
| *G06F 16/334* | (2025.01) |
| *G06F 16/335* | (2019.01) |
| *G06F 40/205* | (2020.01) |
| *G06F 40/40* | (2020.01) |

(52) U.S. Cl.
CPC ........... *G06Q 10/087* (2013.01); *G06F 9/541* (2013.01); *G06F 9/547* (2013.01); *G06F 11/3409* (2013.01); *G06F 16/24528* (2019.01);

*G06F 16/24535* (2019.01); *G06F 16/3344* (2019.01); *G06F 16/335* (2019.01); *G06F 40/205* (2020.01); *G06F 40/40* (2020.01)

(58) Field of Classification Search
CPC . G06Q 10/087; G06F 16/3344; G06F 16/335; G06F 16/24528; G06F 16/24535; G06F 11/3409; G06F 9/547; G06F 9/541; G06F 40/40; G06F 40/205
See application file for complete search history.

(56) References Cited

U.S. PATENT DOCUMENTS

| | | | | |
|---|---|---|---|---|
| 2019/0132264 A1* | 5/2019 | Jafar Ali | ............... | G06F 40/295 |
| 2019/0197111 A1* | 6/2019 | Garrote | ................... | G06F 40/30 |
| 2021/0216443 A1* | 7/2021 | Park | .................... | G06F 11/3688 |
| 2022/0253607 A1* | 8/2022 | Aubineau | ............... | H04L 51/02 |
| 2023/0153541 A1* | 5/2023 | Carbajales | ............... | G06N 3/08 |
| | | | | 704/9 |
| 2023/0244552 A1* | 8/2023 | Dewhare | ............. | G06F 9/44521 |
| | | | | 719/328 |

(Continued)

*Primary Examiner* — Anibal Riveracruz
(74) *Attorney, Agent, or Firm* — Sterne, Kessler, Goldstein & Fox P.L.L.C.

(57) ABSTRACT

A system, method, and device embodiments are provided for programmatically generating and deploying an integration application based on a natural language request without requiring any coding by a user. The application generator infers the sources, targets, connectors, operations, entities, and data mappings needed to build the requested integration application. An exposed web service or API may receive natural language input, determine the meaning of the request, and generates and deploys the resulting integration application without requiring any coding by a user.

20 Claims, 7 Drawing Sheets

200

```
┌─────────────────────┐
│ Receive natural language │ ～ 202
│        input         │
└─────────────────────┘
          │
┌─────────────────────┐
│  Retrieve API catalog │ ～ 204
└─────────────────────┘
          │
┌─────────────────────┐
│  Match source/target │ ～ 206
└─────────────────────┘
          │
┌─────────────────────┐
│    March entity(ies)  │ ～ 208
└─────────────────────┘
          │
┌─────────────────────┐
│   Match operation(s)  │ ～ 210
└─────────────────────┘
          │        212
     No  ╱╲  Yes    ┌─────────────────┐
    ◄────╱  ╲───────►│  Return Response │ ～ 214
        ╲Matches╱    └─────────────────┘
        ╲found?╱              │
          ╲╱          ┌─────────────────┐
                      │ Build integration│ ～ 216
                      │   application   │
                      └─────────────────┘
                              │
                      ┌─────────────────┐
                      │  Delay application│ ～ 218
                      └─────────────────┘
```

(56)                    References Cited

U.S. PATENT DOCUMENTS

| | | | |
|---|---|---|---|
| 2023/0252233 A1* | 8/2023 | Gutierrez | G06F 40/40 |
| | | | 704/9 |
| 2023/0266969 A1* | 8/2023 | Mohan | G06F 9/547 |
| | | | 712/209 |
| 2024/0144240 A1* | 5/2024 | Edwards | G06Q 20/12 |
| 2024/0320063 A1* | 9/2024 | Wang | G06F 9/541 |
| 2024/0385915 A1* | 11/2024 | Chilakamarri | G06F 9/541 |
| 2024/0394251 A1* | 11/2024 | Brende | G06F 11/3409 |

* cited by examiner

400A

400B

400C

NO-CODE GENERATION OF INTEGRATION APPLICATIONS

BACKGROUND

Integration platforms allow organizations to design, implement, and deploy software tools that harness heterogeneous resources across a technical landscape. An organization's technical landscape may incorporate a wide-array of applications, services, data sources, application programming interfaces (APIs), and other resources. This may include custom-built applications, legacy applications, database applications, cloud-based applications, enterprise-resource-planning applications, etc.

These applications and their data may reside in different locations. Organizations may also connect to a wide-array of third-party systems, applications, services, and APIs to access additional data and integrate further functions.

An integration application may leverage and incorporate data from across these disparate systems, services, and applications. Integration platforms may allow users to design and deploy integration applications. An integration platform may bridge disparate technical resources by centralizing communications, allowing integration applications to authenticate with and connect to external resources, databases, and applications.

In one example use case, an organization may deploy an extract, transform, load (ETL) pipeline that pulls data from disparate sources, transforms and aggregates the data, and stores the result in a data warehouse, relational data store, data visualization software tool, or other destination for reporting and analysis or other client-facing applications.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1:
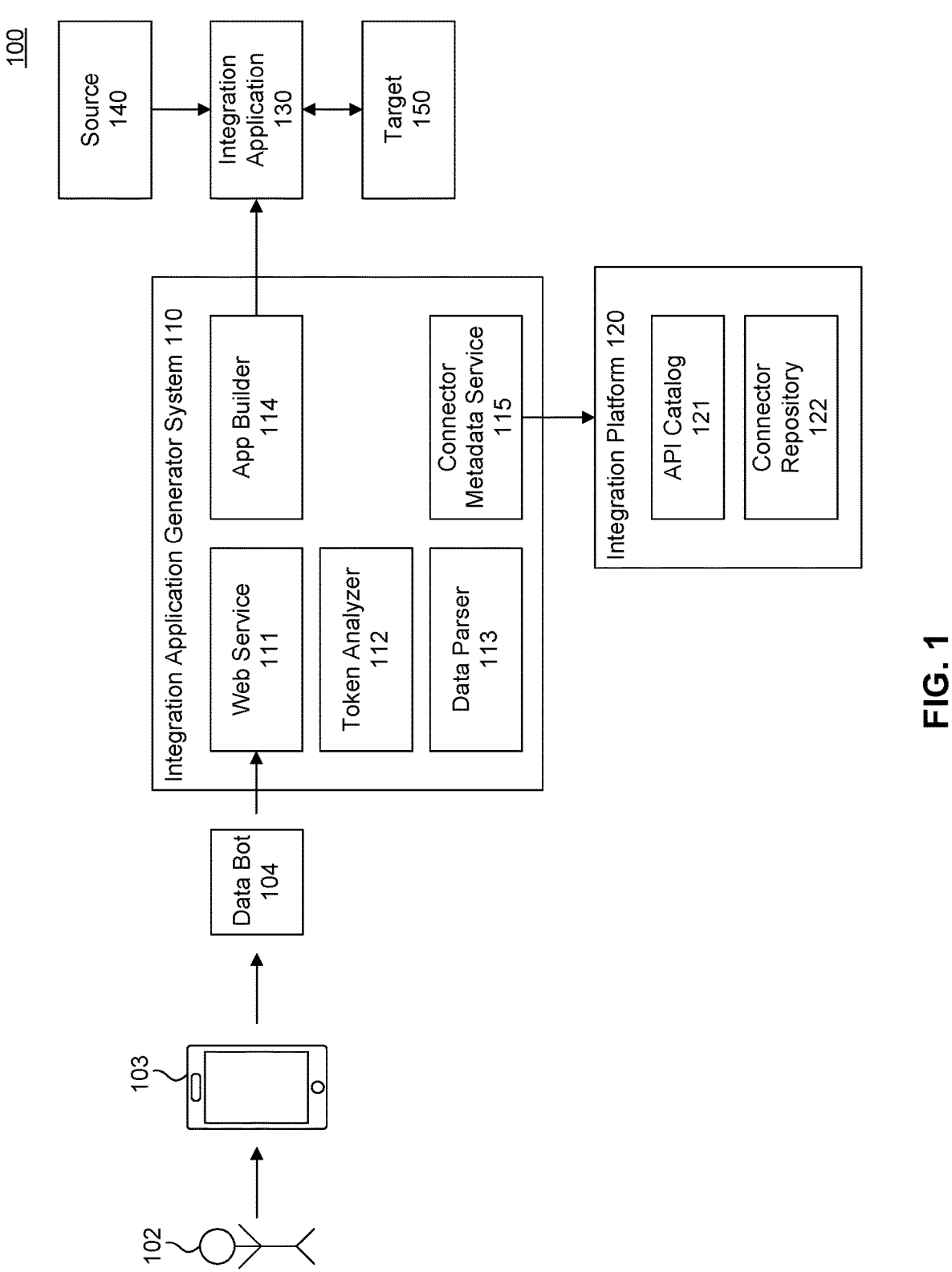
FIG. 1 is a block diagram of environment including an integration application generator, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for programmatically generating and deploying an integration application based on a natural language input without requiring any coding by a user. The integration application generator infers the sources, targets, connectors, operations, entities, and data mappings needed to build the requested integration application.

An integration platform may allow users to create and deploy business processes, applications, and software tools that access and transform resources across a technical landscape. These software tools will be referred to herein as integration applications. However, building an integration application is technically difficult, time-consuming, and requires significant domain-specific knowledge.

Legacy tools may offer enhanced graphical user interfaces that allow users to build an integration application. However, these tools still require the user to select from pre-generated connectors, configure sources and targets, manually create the flow, map the data, and update software code before deploying the integration application. Some legacy tools may provide templates for specific industries (e.g., healthcare, communications, etc.). However, these approaches still require a user to select the proper template and recreate, reconfigure, and remap the pre-fabricated integration application to fit their specialized purpose before deployment.

Accordingly, a need exists to programmatically generate and deploy an integration application based on a received natural language input by inferring the sources, targets, connectors, operations, entities, and data mappings of a requested integration application. The inference relies upon API specifications in an API catalog. After determining the requisite sources, targets, connectors, operations, entities, and data mappings, the technique may generate and deploy an integration application to accommodate the natural language request.

An additional technical benefit may be realized over legacy systems by exposing a web service or API that receives the natural language input. The exposed web service may be accessible by a chat application, such as SLACK, that is integrated with the integration platform or otherwise in communication with the user. Using the chat application, the user may type, speak, or otherwise input a natural language input to build an integration application. Illustrative examples of such natural language input may be: (1) "I want to get all the Users, Vendors, and Invoices from the travel management tool"; (2) "I want to move every 10 minutes all the available vendors from the travel management tool and every 5 minutes opportunities, campaigns and sales persons from the marketing tool to the cloud storage tool"; or (3) "I need to capture all the customers from the payment processing platform." These are merely exemplary and more elaborate integration applications could be processed and accommodated within the context of this disclosure. Moreover, these examples are generalized, and the user may name a particular "travel management tool," "cloud storage tool," "payment processing platform," etc. by its trade name or other identifying term. The integration application generator may then build the integration application and return an appropriate response to the chat application via the web service—e.g., a confirmation, a link to an integration platform or external data tool, a graphical representation of the integration application, etc.

An additional technical benefit may be realized by tokenizing the natural language input—i.e., dividing the natural language input into words or groups of characters. A token analyzer may reference an API catalog that includes API specifications for each API in the API catalog. By cross-referencing the inputted tokens to the API specifications in the API catalogs, the token analyzer may intelligently ascertain the source(s), target(s), operation(s), and entity(ies) required by the integration application requested by the user. If an ambiguity exists in the inferred requirements, the system may return a request for more information to the user via an appropriately response. In such a scenario, the token analyzer may use using prior-inputted natural language in subsequent requests to inform and fine-tune future responses. In one embodiment, the token analyzer may be a generative pre-trained transformer (GPT).

To recognize the source, target, operation, and entity, the token analyzer may first match an API in the API catalog that best matches the user-specified source token(s). Once an associated API for the source is identified, the system may determine an entity or entities associated with a specified entity token or tokens using an API Specification for the particular API. The system may then identify operation(s) associated with the entity from the API Specification that match an operation token. A target may be identified in a similar fashion as the source, implied by default, or otherwise identified.

For example, if a user sends a natural language input of "I want to move every 10 minutes all the available vendors from the travel management tool and every 5 minutes opportunities, campaigns and sales persons from the marketing tool to the cloud storage tool," the sources are "travel management tool" and "marketing tool," target is "cloud storage tool," the entities are "vendors," "opportunities," "campaigns," and "sales persons," and the operation is "move." A timing condition is specified of "every 10 minutes."

Note that in the above example, the sources and target are generalized, but the user may name a particular "travel management tool," "cloud storage tool," "payment processing platform," etc. by its trade name or other identifying term. The listed source, target, entities, and operations may be referred to below as a token source, token target, token entity, and token operation because they reflect the value received from the user. A difference between the token source and the source—e.g., a user may request "commercial cloud" instead of "SALESFORCE COMMERCE CLOUD." Or there may be differences between the entity defined in the API specification and the received natural language (e.g., "sales persons" instead of "salesperson," "user" instead of "users," "jobs" instead of "opportunities," etc.). However, the token analyzer may resolve these differences using appropriate phonetic algorithms that are known in the relevant arts (e.g., a Soundex algorithm).

Once the source, target, operation, and entity are identified, the generator may programmatically generate an integration application. The integration application may include credentials to authenticate with and connect to the source and the target, appropriate calls to the API that perform the operation that retrieve or otherwise reference the entities, and an expression language script that performs any specified transformations. In some scenarios, transformations may map the data to a format required by the target (e.g., moving JSON to CSV). For other natural language requests, the transformation may be more complicated—e.g., a user may ask to rename a field by typing "I want to rename the User as Accounts" or restrict the data by typing "I want only the Users where status is active." Appropriate expression scripts may be generated and associated with the integration application. In one embodiment, the expression script may be embedded in the integration application. As will be understood by one skilled in the relevant arts, the types of transformations that may be performed by such an expression language (e.g., the powerful DataWeave language) is expansive and far-reaching.

A further technical benefit may be realized over legacy tools by generating and returning a graphical representation in response to the received natural language. The graphical representation may be a single image that represents the integration application—i.e., the determined source, target, operation, and entity. This graphical representation may be returned to the chat application via an appropriately formatted response as a means of verifying the user's intent prior to deploying the integration application. This provides an additional safeguard and ensures that any ambiguity in the natural language input may be identified and resolved by requesting follow-up information. As noted above, the token analyzer may use prior inputted natural language in subsequent requests to fine-tune future responses.

FIG. 1 is a block diagram of environment 100 including an integration application generator system, according to some embodiments. As illustrated in FIG. 1, environment 100 may include user 102, device 103, data bot 104, integration application generator system 110, web service 111, token analyzer 112, data parser 113, application builder 114, connector metadata service 115, integration platform 120, API catalog 121, connector repository 122, integration application 130, source 140, and target 150.

User 102 may be a developer or other individual designing, developing, and deploying an integration application using an integration platform. User 102 may be a member of a business, organization, or other suitable group. User 102 may be a human being, but user 102 may also be an artificial intelligence construct. User 102 may connect to a network or combination of networks including the Internet, a local area network (LAN), a wide area network (WAN), a wireless network, a cellular network, or various other types of networks as would be appreciated by a person of ordinary skill in the art.

Device 103 may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Although device 103 is illustrated in the example of FIG. 1 as a single computer, one skilled in the art(s) will understand that device 103 may represent two or more computers in communication with one another. Therefore, it will also be appreciated that any two or more components of device 103 may similarly be executed using some or all of the two or more computers in communication with one another.

Data bot 104 provides a mechanism through which user 102 may interact with an interactive agent, chatbot, or other communication channel using device 103. In an embodiment, communications between user 102 and data bot 104 may be text-based, speech- or sound-based, or occur in any other suitable communication medium. For example, data bot 104 may be Messenger, Slack, Chatterbox, WhatsApp, Email, Skype, etc. Data bot 104 could transpire through verbal exchanges instead of text messages, for example, in speaking interactions with Alexa, Google Home, HomePod, etc. Data bot 104 can exchange packets with device 103 via a network, which includes any or all of a LAN, WAN, the Internet, or other public network. In some embodiments, data bot 104 may coexist on or within the integration platform, but in other embodiments, data bot 104 may interact with integration application generator system 110 via a LAN, WAN, the Internet, or other public network. In one embodiment, user 102 may access data bot 104 using an @ mention to an appropriate handle, link, address, or other suitable identifier. In this embodiment, messages from user 102 will ultimately be director to integration application generator system 110 via data bot 104.

Integration application generator system 110 may programmatically generate and deploy an integration application based on a natural language input received from user 102. Integration application generator system 110 may determine the source, target, operation, and entity needed to build the integration application based on the natural language input. Integration application generator system 110 may then generate and deploy an integration application to accommodate the request to an integration platform. For example, user 102 may type, speak, or otherwise input a natural language request for an integration application to data bot 104. Integration application generator system 110 may comprise: web service 111, token analyzer 112, data parser 113, application builder 114, and connector metadata service 115.

Web service 111 may be a web service, API, microservice, or other suitable interface exposed by integration application generator system 110 to interact with user 102. Web service 111 may be accessible by data bot 104 and may receive and process natural language input. To provide various services and functions, web service 111 may employ suitable lightweight network protocols, e.g., HTTP, and provide specific, tailored functions, modules, messaging protocols, etc. to user 102 and/or data bot 104. For example, web service 111 may provide functions and methods to request the creation of an integration application from integration application generator system 110. Web service 111 may formulate and return appropriate responses—e.g., a link to an integration platform or tool where the integration application is deployed, a graphical representation of a proposed integration application, a confirmation that the integration application was deployed, a request for additional information, and/or other suitable responses. Web service 111 may provide additional features, functions, and services to fulfill a variety of requirements and use cases within integration application generator system 110 at scale.

Token analyzer 112 may tokenize received natural language input by dividing the natural language input into words or groups of characters. Token analyzer 112 may reference connector repository 122 by engaging connector metadata service 115 to determine APIs in an API catalog that match a source token and retrieve the API specifications as needed. By cross-referencing the tokens to the API specifications in the API catalogs, token analyzer 112 may determine the operation(s) and entity(ies) required by a requested integration application. In one embodiment, token analyzer 112 may be a generative pre-trained transformer (GPT). Token analyzer 112 may match an API in the API catalog to the user-specified source token(s). Once an associated API for the source is identified, token analyzer 112 may determine the entities defined in the API specification that match or are otherwise associated with the entity token. Token analyzer 112 may then identify operation(s) associated from the API Specification based in further part on the requested entity. For example, if an entity requested is "users," then an appropriate API call may be identified in the API specification such as "getUserso." A target may be identified in a similar fashion as the source, implied by default, or otherwise identified.

For example, if a user sends a natural language input of "I want to move every 10 minutes all the available vendors from the travel management tool and every 5 minutes opportunities, campaigns and sales persons from the marketing tool to the cloud storage tool." The source, target, entities, and operations as received in the natural language may be referred to below as a token source, token target, token entity, and token operation because they reflect the value received from the user. Here, token analyzer 112 may identify that the source is the travel management tool because an API exists in the API catalog matching "travel management tool." For example, a user may request a source of "SALESFORCE COMMERCE CLOUD" for which an API exists in the API catalog. Similarly, an API may exist in the API catalog matching the target. Token analyzer 112 may then reference the API Specification for SALESFORCE COMMERCE CLOUD to determine matching operations that provided by the API matching the token entities of "vendors," "opportunities," "campaigns," and "sales persons." For vendors, e.g., operations may exist such as "getVendors," "updateVendors," etc. Because the user has requested a "move" of the vendors from the SALESFORCE COMMERCE CLOUD, token analyzer 112 may accordingly select a "getVendors" API call to get the data out of the source. A difference may exist between the token source and the source—e.g., a user may request "commercial cloud" instead of "SALESFORCE COMMERCE CLOUD." Or there may be differences between the entity defined in the API specification and the received natural language (e.g., "sales persons" instead of "salesperson," "user" instead of "users," "jobs" instead of "opportunities," etc.). However, token analyzer 112 may resolve these differences using appropriate phonetic algorithms that are known in the relevant arts (e.g., a Soundex algorithm). However, if no source token was not found in the API catalog and/or no entity token or operation token is found in the API specification, a map entry may be set to null. Null entities produce an exception trigger and user 102 may be informed that the requested data is not available in the requested service.

Data parser 113 may be parser used to analyze the natural language received from the user. Data parser 113 may work in tandem with token analyzer 112—e.g., by parsing received natural language input, building an abstract syntax tree (AST), and providing the AST/tokens to token analyzer 112.

Application builder 114 may receive the sources, targets, entities, and operations derived from the natural language by token analyzer 112. Application builder 114 may build an integration application matching the intent of the received natural language. The integration application may include credentials to authenticate with and connect to the source and the target, appropriate calls to the API that perform the operation that retrieve or otherwise reference the entities, and an expression language script that performs any specified transformations. Application builder 114 may also create an expression language script to transform the result as it is received from the source. If the user expressed in their statement transformation requirement, such as: "I want to rename the User as Accounts" or "I want only the Users where status is active" then additional transformation messages may be added expression language script to perform corresponding transformations. These transformation messages may be expression language scripts (e.g., DATAWEAVE scripts). Application builder 114 may then create a bulk job operation in the integration platform and execute the job.

Connector metadata service 115 may receive expected connector names and entities and retrieve the corresponding connector from storage. Connector metadata service 115 may search for a connector in an asset storage, e.g., the exchange application in the ANYPOINT PLATFORM. Connector metadata service 115 may retrieve the appropriate API Specification and parse the specification using an Anything Modeling Language (AML) library. With the result, connector metadata service 115 may match the information with the token information provided—i.e., a connector with the list of connectors available.

Integration platform 120 may be a software platform employed to access a plurality of software applications, services, and data sources and to design, maintain, and deploy integration applications. In some examples, integration platform 120 may incorporate at least one of an enterprise service bus (ESB) architecture, micro-service architecture, or service oriented architecture (SOA). In some embodiments, integration platform 120 may allow a user to build and deploy integrations that connect to third-party systems and provide additional functionalities to further integrate data from a wide-array of organizational and cloud-based data sources. Integration platform 120 may allow users to build integration flows and APIs and to design integration applications that access, manipulate, store, and leverage data from disparate technical resources.

API catalog 121 may be a curated catalog of assets that include APIs and connectors. These APIs may span a variety of different types of APIs including: Async API, GraphQL APIs, HTTP APIs, REST APIs, SOAP APIs and other suitable APIs. API catalog 121 may include additional asset types such as API groups, specification fragments, connectors, libraries, examples, policies, templates, rulesets, and other suitable asset types. Various standardized and certified assets may be provided in API catalog 121 by integration platform 120 by default. API catalog 121 may be also extended by an organization to include private assets by publishing the custom assets towards/within API catalog 121. API catalog 121 may include API specifications for each API or asset in API catalog 121. The API specifications may adhere to an API description format. For example, an API description format may be an OpenAPI Specification (OAS), a RESTful API Modeling Language (RAML), or another suitable API format.

Connector repository 122 may provide connectors between integration platform 120 and external resources, such as databases, APIs for software as a service (SaaS) applications, and other endpoints. Connector repository 122 may include pre-built connectors that provide reliable connectivity solutions to connect to a wide range of applications, e.g., SALESFORCE, AMAZON S3, MONGO DB, SLACK, JIRA, SAP, WORKDAY, KAFKA, and many other assets. Connectors in connector repository 122 may connect to data source 140 and data target 150, authenticating, and performing raw operations to receive and insert data. Connectors in connector repository 122 may support additional features such as OAuth, non-blocking operations, stateless connection, low-level error handling, and reconnection.

Integration application 130 may be a software tool that leverages and incorporates data from across systems, services, and applications in an organization's technical landscape. Integration application 130 may include credentials to authenticate with and connect to the source and the target, appropriate calls to the API that perform the operation that retrieve or otherwise reference the entities, and an expression language script that performs any specified transformations. Integration application 130 may be an XML file, Java file, or take other suitable forms. Integration application 130 may be deployed to run on a MULE RUNTIME, JAVA, APACHE CAMEL, or other suitable integration platform. The below is an exemplary and non-limiting pseudocode representation of integration application 130. In this example, integration application 130 may be generated to move invoices from SALESFORCE COMMERCE CLOUD to STRIPE.

```
<?xml version="1.0" encoding="UTF-8"?>
<mule [include various libraries)]">
    <mule-commerce-cloud-connector:config name="Commerce_Cloud_Config" [params] />
    <s3:config name="Amazon_S3_Configuration" doc:name="Amazon S3 Configuration"
    doc:id="[docID]" >
        <s3:connection accessKey="[keyInfo]" />
    </s3:config>
    <stripe:config name="Stripe_Connector_Config" doc:name="Stripe Connector Config"
    doc:id="[docID]" >
        <stripe:api-key-connection baseUri="[URL]"/>
    </stripe:config>
<flow name="Dump_invoices_from_Commerce_Cloud_1" >
    <scheduler doc:name="Scheduler" doc:id="[docID]" >
        <scheduling-strategy >
            <fixed-frequency />
        </scheduling-strategy>
    </scheduler>
<mule-commerce-cloud-connector:get-invoices doc:name="Get invoices" doc:id="[docID]" config-
ref="Commerce_Cloud_Config"/>
    <ee:transform doc:name="to CSV" doc:id="[docID]">
        <ee:message>
          <ee:set-payload>
            <![CDATA[%dw 2.0 output application/csv quoteValues=true
            ---
            flatten(payload.invoices) map ((record, index) ->
            {
            invoiceId:record.invoiceId,
            invoiceNumber:record.invoiceNumber,
            invoiceDate:record.invoiceDate,
            currencyCode:record.currencyCode,
            totalAmount:record.totalAmount,
            taxAmount:record.taxAmount,
            }
            )]]>
```

-continued

```
    </ee:set-payload>
   </ee:message>
  </ee:transform>
  <s3:put-object doc:name="Put Object" doc:id="[docID]" config-ref="Amazon_S3_Configuration"
  key="t/cloud_invoices.csv" bucketName="testgenie"/>
 </flow>
</mule>
```

In this example, the identified source is SALESFORCE COMMERCE CLOUD, the entity is "invoices," and the operation is "get-invoices." A transformation is performed using the expression language script (in ee:set-payload) that transforms the output to CSV format. The target is S3/STRIPE with the operation at the target being "put-object." In the above example, the "scheduling-strategy" parameters may be used to specify a timing condition, e.g., every 10 minutes.

As will be understood by one skilled in the relevant arts, the types of transformations that may be performed by an expression language (e.g., the powerful DATAWEAVE language) is expansive. For example, another instance of an expression language script that may be included in integration application 130 may be:

```
%dw 2.0
output application/csv quoteValues=true
---
flatten(payload.vendors) map ((record, index) ->
{
    vendorId: record.vendorId,
    name: record.name,
    Address_addressLine1: record.address.addressLine1,
    address_addressLine2: record.address.addressLine2,
    address_city: record.address.city,
    address_state: record.address.state,
    address_postalCode: record.address.postalCode,
    address_country: record.address.country,
    contact_firstName: record.contact.firstName,
    contact_lastName: record.contact.lastName,
    contact_email: record.contact.email,
    contact_phone: record.contact.phone,
    taxId: record.taxId,
    paymentTerm: record.paymentTerm,
    currency: record.currency,
})
```

Data source 140 may be a data resource included in an organization's technical landscape. Data source 140 may provide access to data stored in a number of fashions, such as in a suitable data repository, either in a raw form or following (or at an intermediate step within) the application of a transformational capability. Data source 140 may include data lakes, data silos, message streams, relational databases, semi-structured data (e.g., CSV, logs, xml, etc.), unstructured data, binary data (e.g., images, audio, video, etc.), or other suitable data types in appropriate repositories, both on-premises and on the cloud. While only one data source is illustrated in FIG. 1 for reference, there may be any number of data sources in environment 100. In some embodiments, data source 140 may be an API that integration platform 120 may interact with. For example, integration platform 120 may receive and manipulate data from data source 140. An API exposed by data source 140 may adhere to one of a number of API design methodologies or protocols. For example, the API may be a Web-API such as a RESTful API or a SOAP API, an RPC-driven API, JDBC API, a streaming API, or adhere to one of many other API design methodologies. Moreover, data source 140 may be an additional resource that is not an API.

For example, data source 140 may provide data or functionalities by connecting to a CRM system (e.g., data source 140 may be an API provided by SALESFORCE to access CRM data), an ERP system, a database, an internet-Of-Things device, a mobile phone, a watch, a JIRA tasklist, a revision control system or other code management tool, and/or a multitude of other sources. For example, in some embodiments, data source 140 may be ADOBE MARKETO, AMAZON DYNAMODB, AMAZON EC2, AMAZON KINESIS, AMAZON LAMBDA, AMAZON RDS, AMAZON REDSHIFT, AMAZON S3, AMAZON SNS, AMAZON SQS, AMQP, APACHE CASSANDRA, APACHE KAFKA, AS2, ASANA, AZURE COSMOS DB, AZURE DATA LAKE STORAGE, AZURE KEY VAULT, AZURE SERVICE BUS, BMC REMEDY, BOX, CAQH, CLOUDHUB, DOCUSIGN, DROPBOX, EMAIL, FTP, GMAIL, GOOGLE BIGQUERY, GOOGLE CALENDAR, GOOGLE DRIVE, GOOGLE PUB/SUB, GOOGLE SHEETS, HADOOP, HL7 EDI, HL7 MLLP, HTTP, IBM CTG, IBM MQ, IBM WMQ, IMAP, JDBC, JIRA, JMS, LDAP, MICROSOFT .NET, MICROSOFT DYNAMICS 365, MICROSOFT EXCEL ONLINE, MICROSOFT MSMQ, MICROSOFT ONEDRIVE, MICROSOFT OUTLOOK 365, MICROSOFT POWER BI, MICROSOFT SERVICE BUS, MICROSOFT SHAREPOINT, MICROSOFT TEAMS, MONGODB, MQTT, NOE4J, NETSUITE, OAUTH, ORACLE EBS, ORACLE PEOPLESOFT, ORACLE SIEBLE, POP3, QUARTZ, QUICKBOOKS ONLINE, REDIS, ROOSTIFY, SALESFORCE, SAP CONCUR, SAP 4HANA, SERVICENOW, SHOPIFY, SLACK, SMARTSHEET, SNOWFLAKE, STRIPE, TABLEAU, TRELLO, TWILIO, VEEVA VAULT, WORKDAY, ZEDESK, ZOOM, ZUORA, etc. Many other suitable assets may be considered for data source 140 within the context of this disclosure as will be understood by one skilled in the relevant arts.

Data target 150 may be an API other technical resource or system to be included in an integration flow. While one data target 150 is illustrated in FIG. 1 for reference, there may be any number of data targets in environment 100. In one embodiment, data target 150 may include a data visualization tool such as Tableau that allows data to be explored and analyzed. In another embodiment, data target 150 may be a static data source, e.g., data lakes, data silos, message streams, relational databases, semi-structured data (CSV, logs, xml, etc.), unstructured data, binary data (images, audio, video, etc.), or other suitable data types in appropriate repositories, both on-premises and on the cloud. Though displayed in FIG. 1 as being separate and distinct from data source 140, in some architectures there may be overlap between the sources and the targets—i.e., a data source in one integration application may be a data target in a different integration application. For example, in some embodiments, data target 150 may be ADOBE MARKETO, AMAZON DYNAMODB, AMAZON EC2, AMAZON KINESIS, AMAZON LAMBDA, AMAZON RDS, AMAZON RED-SHIFT, AMAZON S3, AMAZON SNS, AMAZON SQS, AMQP, APACHE CASSANDRA, APACHE KAFKA, AS2, ASANA, AZURE COSMOS DB, AZURE DATA LAKE STORAGE, AZURE KEY VAULT, AZURE SERVICE BUS, BMC REMEDY, BOX, CAQH, CLOUDHUB, DOCUSIGN, DROPBOX, EMAIL, FTP, GMAIL, GOOGLE BIGQUERY, GOOGLE CALENDAR, GOOGLE DRIVE, GOOGLE PUB/SUB, GOOGLE SHEETS, HADOOP, HL7 EDI, HL7 MLLP, HTTP, IBM CTG, IBM MQ, IBM WMQ, IMAP, JDBC, JIRA, JMS, LDAP, MICROSOFT .NET, MICROSOFT DYNAMICS 365, MICROSOFT EXCEL ONLINE, MICROSOFT MSMQ, MICROSOFT ONEDRIVE, MICROSOFT OUT-LOOK 365, MICROSOFT POWER BI, MICROSOFT SERVICE BUS, MICROSOFT SHAREPOINT, MICROSOFT TEAMS, MONGODB, MQTT, NOE4J, NETSUITE, OAUTH, ORACLE EBS, ORACLE PEO-PLESOFT, ORACLE SIEBLE, POP3, QUARTZ, QUICK-BOOKS ONLINE, REDIS, ROOSTIFY, SALESFORCE, SAP CONCUR, SAP 4HANA, SERVICENOW, SHOPIFY, SLACK, SMARTSHEET, SNOWFLAKE, STRIPE, TAB-LEAU, TRELLO, TWILIO, VEEVA VAULT, WORKDAY, ZEDESK, ZOOM, ZUORA, etc.

Figure 2:
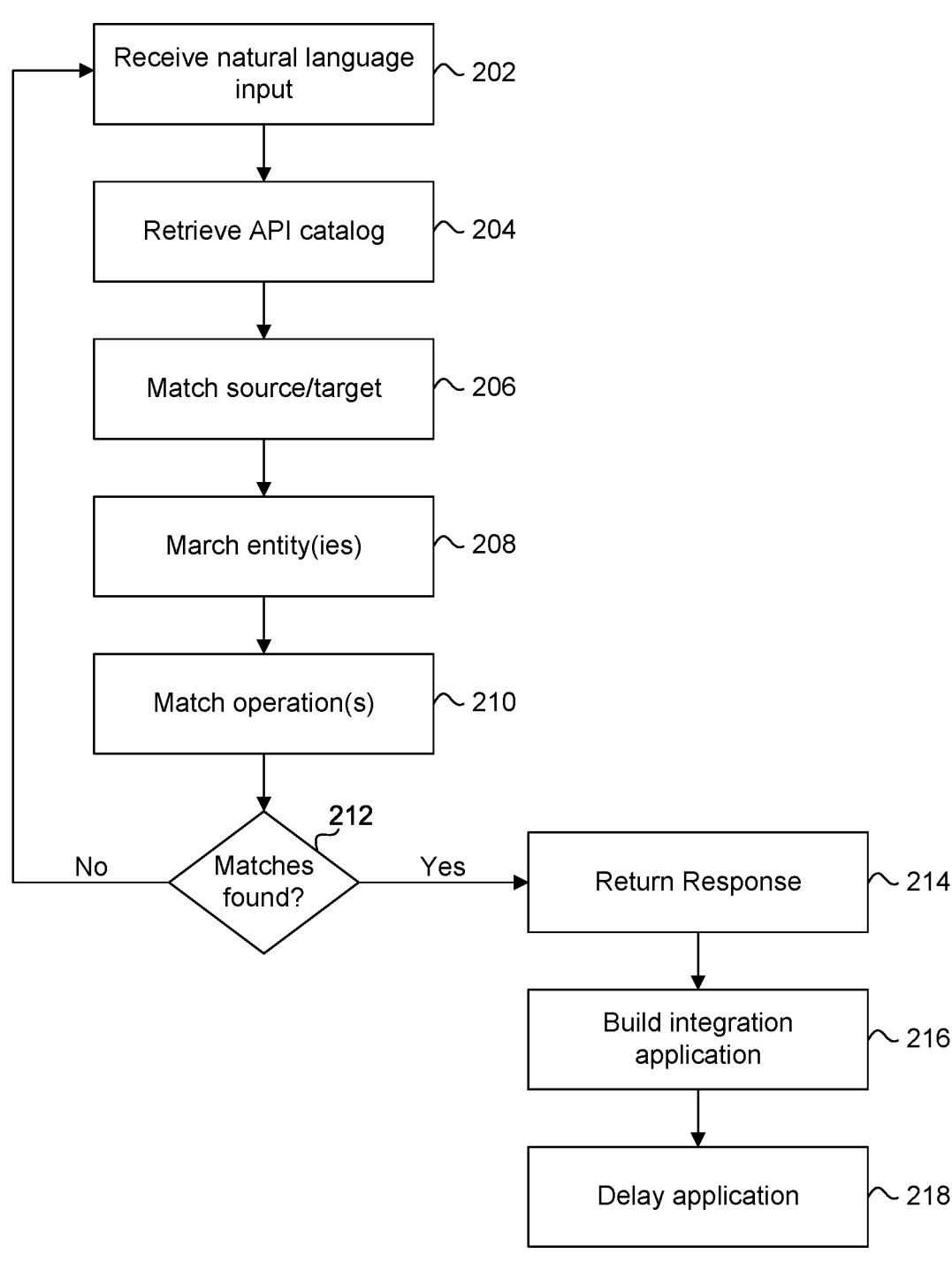
FIG. 2 illustrates a method for building and deploying an integration application based on received natural language, according to some embodiments.

FIG. 2 illustrates a method 200 for building and deploying an integration application based on received natural language, according to some embodiments. Method 200 may be performed by processing logic that can comprise hardware (e.g., circuitry, dedicated logic, programmable logic, micro-code, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art(s).

In 202, integration application generator system 110 may employ web service 111 to receive natural language input from user 102. In one embodiment, web service 111 may expose a service to a chat application such as data bot 104 that allows integration application generator system 110 to receive natural language inputted by user 102 into device 103. Integration application generator system 110 may employ data parser 113 to parse the received natural language input to determine tokens used in subsequent steps. Illustrative examples of such natural language input to request creation of an integration application may be: (1) "I want to get all the Users, Vendors, and Invoices from the travel management tool"; (2) "I want to move every 10 minutes all the available vendors from the travel manage-ment tool and every 5 minutes opportunities, campaigns and sales persons from the marketing tool to the cloud storage tool"; or (3) "I need to capture all the customers from the payment processing platform." These are merely exemplary and more elaborate integration applications could be pro-cessed and accommodated within the context of this disclo-sure.

In 204, integration application generator system 110 may employ connector metadata service 115 to retrieve API catalog 121, i.e., a curated catalog of assets that include API Specifications and connectors. Various standardized and certified assets may be provided in API catalog 121. For example, connector metadata service 115 may retrieve an appropriate connector from connector repository 122. Such a connector may provide access to a variety of data sources and data targets including, e.g., ADOBE MARKETO, AMAZON DYNAMODB, AMAZON EC2, AMAZON KINESIS, AMAZON LAMBDA, AMAZON RDS, AMA-ZON REDSHIFT, AMAZON S3, AMAZON SNS, AMA-ZON SQS, AMQP, APACHE CASSANDRA, APACHE KAFKA, AS2, ASANA, AZURE COSMOS DB, AZURE DATA LAKE STORAGE, AZURE KEY VAULT, AZURE SERVICE BUS, BMC REMEDY, BOX, CAQH, CLOUD-HUB, DOCUSIGN, DROPBOX, EMAIL, FTP, GMAIL, GOOGLE BIGQUERY, GOOGLE CALENDAR, GOOGLE DRIVE, GOOGLE PUB/SUB, GOOGLE SHEETS, HADOOP, HL7 EDI, HL7 MLLP, HTTP, IBM CTG, IBM MQ, IBM WMQ, IMAP, JDBC, JIRA, JMS, LDAP, MICROSOFT .NET, MICROSOFT DYNAMICS 365, MICROSOFT EXCEL ONLINE, MICROSOFT MSMQ, MICROSOFT ONEDRIVE, MICROSOFT OUT-LOOK 365, MICROSOFT POWER BI, MICROSOFT SERVICE BUS, MICROSOFT SHAREPOINT, MICROSOFT TEAMS, MONGODB, MQTT, NOE4J, NETSUITE, OAUTH, ORACLE EBS, ORACLE PEO-PLESOFT, ORACLE SIEBLE, POP3, QUARTZ, QUICK-BOOKS ONLINE, REDIS, ROOSTIFY, SALESFORCE, SAP CONCUR, SAP 4HANA, SERVICENOW, SHOPIFY, SLACK, SMARTSHEET, SNOWFLAKE, STRIPE, TAB-LEAU, TRELLO, TWILIO, VEEVA VAULT, WORKDAY, ZEDESK, ZOOM, ZUORA, etc.

In 206, integration application generator system 110 may employ token analyzer 112 to match a source and target in API catalog 121 to the source token and target token received in and parsed from the natural language input. For example, token analyzer 112 may reference connector repository 122 by engaging connector metadata service 115 to determine APIs in API catalog 121 that match a source token and retrieve the API specifications for the matching source as needed to complete subsequent steps. For example, user 102 may transmit a request having a natural language input of "I want to move every 10 minutes all the available vendors from the travel management tool and every 5 minutes opportunities, campaigns and sales persons from the marketing tool to the cloud storage tool." Token analyzer 112 may identify that the source is the "travel management tool" because an API exists in the API catalog matching that tool or that is otherwise sufficiently similar to the received source token. Similarly, an API may exist in the API catalog matching the target of the cloud storage tool. Differences may exist between the token source and the source as listed API catalog 121—e.g., user 102 may request "commercial cloud" instead of "SALESFORCE COM-MERCE CLOUD." Token analyzer 112 may resolve these differences using appropriate phonetic algorithms that are known in the relevant arts (e.g., a Soundex algorithm). A target may be identified in a similar fashion as the source or in other embodiments determined based on a default setting or other configurations.

In 208, integration application generator system 110 may employ token analyzer 112 to match the entity or entities in the natural language input to an entity or entities in a retrieved API Specification. By cross-referencing the entity tokens to an API specification in API catalog 121, token analyzer 112 may determine the entity(ies) required by a requested integration application. In one embodiment, token analyzer 112 may use GPT to make this determination. Token analyzer 112 may determine the entities defined in the API specification that match or are otherwise associated with the entity token. To continue the above example of a received input of "I want to move every 10 minutes all the available vendors from the travel management tool and every 5 minutes opportunities, campaigns and sales persons from the marketing tool to the cloud storage tool," an entity could be identified in the SALESFORCE COMMERCE CLOUD API specification matching "vendors." Token analyzer 112 may similarly resolve differences using appropriate phonetic algorithm such as a Soundex algorithm.

In 210, integration application generator system 110 may employ token analyzer 112 to identify operation(s) associated from the relevant API Specification based in further part on the entity or entities identified in 208. For example, if an entity requested is "users," then an appropriate API call may be identified in the API specification such as "getUserso." Token analyzer 112 may then reference the API Specification for SALESFORCE COMMERCE CLOUD to determine matching operations that provided by the API matching the token entities of "vendors," "opportunities," "campaigns," and "sales persons." For vendors, e.g., operations may exist such as "getVendors," "updateVendors," etc. Because the user has requested a "move" of the vendors from SALESFORCE COMMERCE CLOUD, token analyzer 112 may accordingly select a "getVendors" API call to get the data out of SALESFORCE COMMERCE CLOUD and a "putVendors" API call to copy the data into the cloud storage tool. While there may be differences between the entity defined in the API specification and the received natural language (e.g., "sales persons" instead of "salesperson," "user" instead of "users," "jobs" instead of "opportunities," etc.), token analyzer 112 may resolve these differences using a phonetic algorithm.

In 212, integration application generator system 110 may determine if matches were found for the source, target, entity, and operations. If matches were found for each requirement of the integration application, method 200 may proceed to 214. If ambiguities remain, i.e., if no source token was not found in the API catalog and/or no entity token or operation token is found in the API specification, a map entry may be set to null. Null entities produce an exception trigger and user 102 may be informed that the requested data is not available in the requested service. In such an instance, method 200 may return to 202 to receive additional input from user 102. For example, web service 111 may formulate an appropriate response and return the response to user 102. Token analyzer 112 may use prior inputted natural language in subsequent requests to fine-tune future responses, and thus token analyzer 112 may be likely to more accurately identify the source, target, entity, or operation on subsequent iterations in light of additional inputs from user 102.

In 214, integration application generator system 110 may return an appropriate response to user 102 via web service 111. In various embodiments, the response may be a link to an integration platform or tool where the integration application is deployed, a graphical representation of a proposed integration application, a confirmation that the integration application was deployed, a request for additional information, and/or other suitable responses. In embodiments where confirmation and/or additional information is sought from user 102, integration application generator system 110 may wait to proceed to 216 until such confirmation is received.

In 216, integration application generator system 110 may employ application builder 114 to build an integration application—i.e., integration application 130—that performs the function requested by the user's natural language input. Integration application 130 may include credentials to authenticate with and connect to the source and the target, appropriate calls to the API that perform the operation that retrieve or otherwise reference the entities, and an expression language script that performs any specified transformations.

In 218, integration application generator system 110 may deploy the generated integration application to integration platform 120. Deployment may rely on an appropriate runtime engine available on integration platform 120. Integration application generator system 110 may deploy the application to run at a regular interval in accordance with a timing condition specified in the natural language input. For example, integration application 130 may be configured to run every 10 minutes. In some embodiments, a timing condition may be implied or determined as a default.

Figure 3:
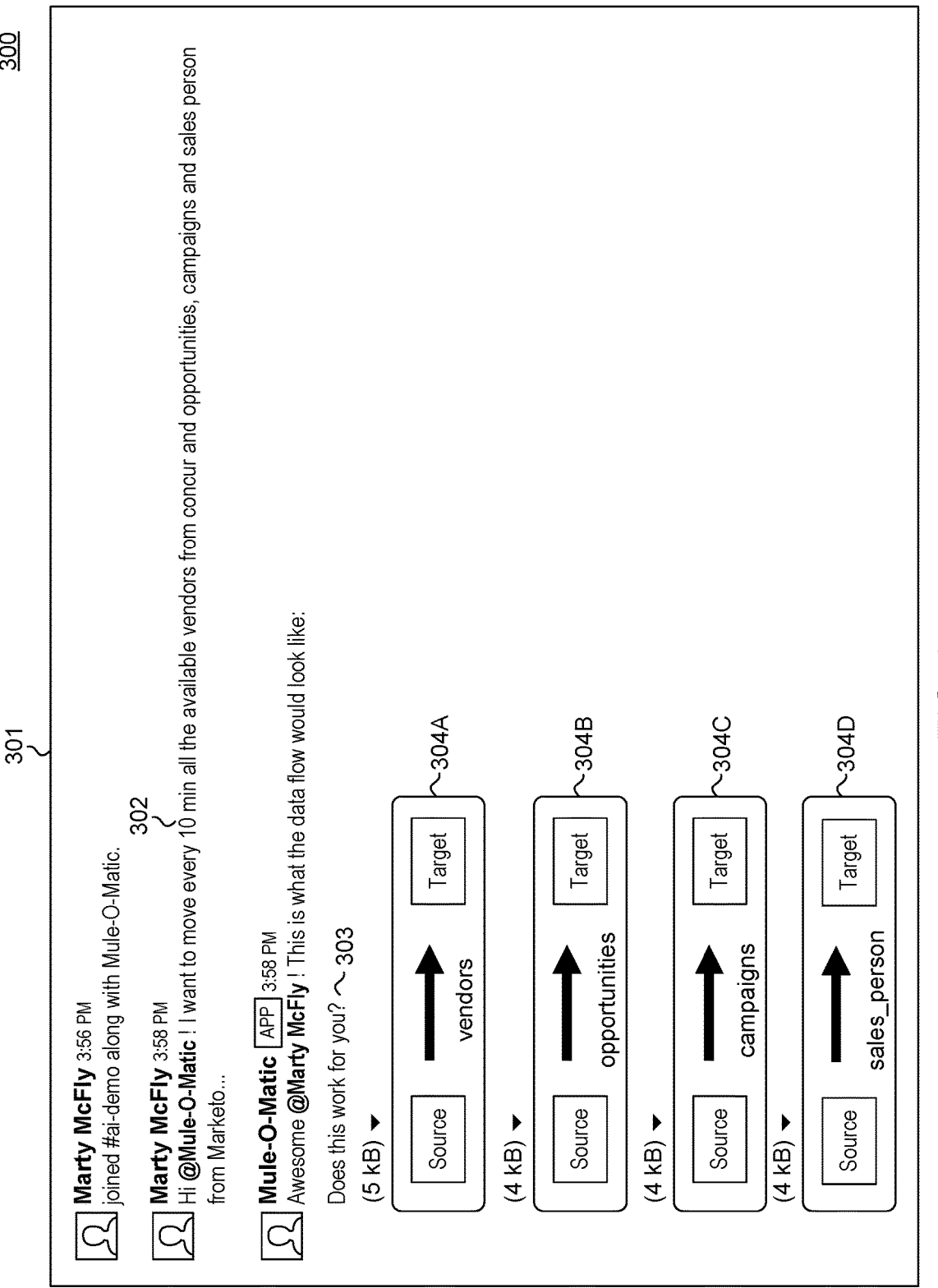
FIG. 3 is an example screen display of a chat application displaying a response from the integration application generator system, according to some embodiments.

FIG. 3 is an example screen display 300 of a chat application displaying a response from the integration application generator system, according to some embodiments. As illustrated in FIG. 3, screen display 300 may include chat application 301, natural language input 302, response 303, and graphical representation 304A-D.

Chat application 301 may be a communication interface, chatbot, interactive agent or other messaging tool. Chat application 301 may be text-based, speech- or sound-based, or occur in any other suitable communication medium. For example, chat application 301 may be Messenger, Slack, Chatterbox, WhatsApp, Email, Skype, etc. In the exemplary screen display of FIG. 3, user 102 is named "Marty McFly" and is using chat application 301 to interface with integration application generator system 110, who operates under a user name of "Mule-O-Matic."

Natural language input 302 may be entered by user 102 in chat application 301 to request the programmatic generation of an integration application. In the example provided in FIG. 3, user 102 has @ mentioned Mule-O-Matic to inform integration application generator system 110 of the request. Here, user 102 inputs natural language that reads "I want to move every 10 min all the available vendors from the travel management tool and opportunities from the marketing tool."

Response 303 may be provided in chat application 301 to the user in response to natural language input 302. Here, the tool has responded with "Awesome @Marty McFly! This is what the data flow would look like" and provided several graphical representations—i.e., graphical representation 304A-D—to confirm the user's intent. As discussed above, in other embodiments, response 303 may be a link to an integration platform or tool where the integration application is deployed, a graphical representation of a proposed integration application, a confirmation that the integration application was deployed, a request for additional information, and/or other suitable responses.

Figure 4A:
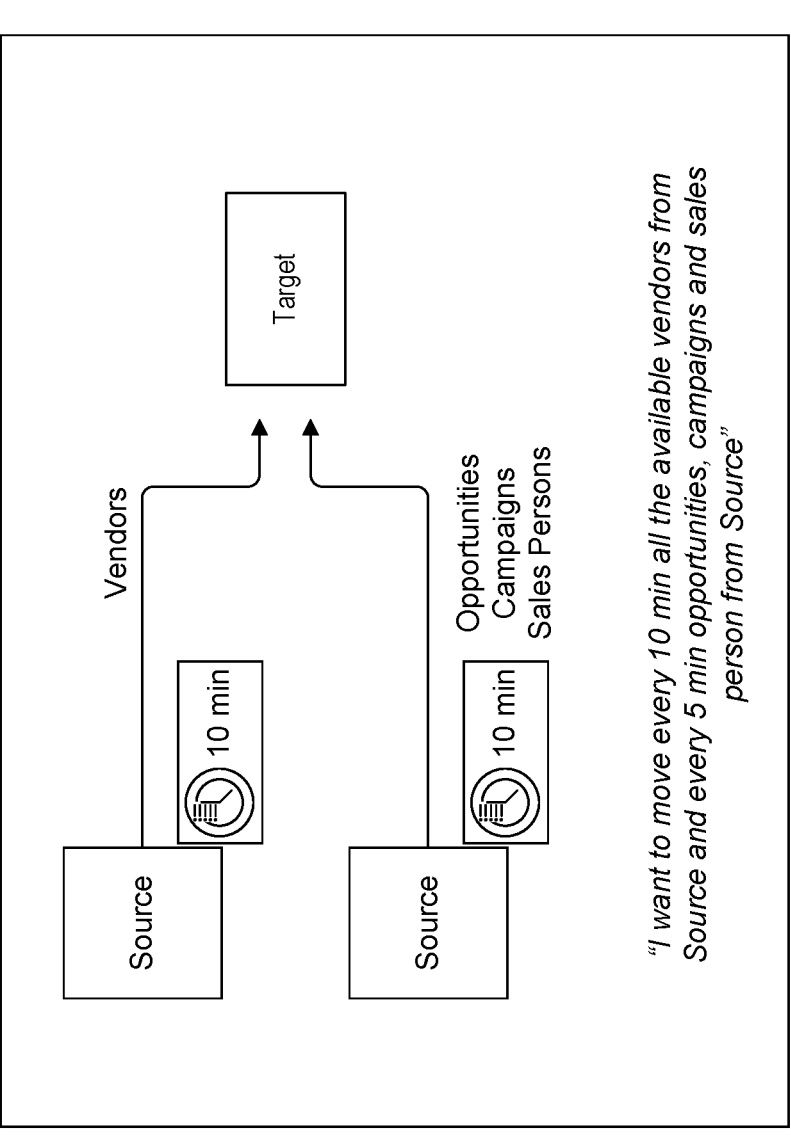
FIGS. 4A-4C illustrate graphical representations of an automatically generated integration application, according to some embodiments.

FIG. 4A is an example screen display 400A of a graphical representation of an automatically generated integration application, according to some embodiments. As illustrated in FIG. 4A, screen display 400A may include graphical representation 400A. The graphical representation in screen display 400A represents in graphical form an integration application based on a request of "I want to move every 10 min all the available vendors from Source and every 5 min opportunities, campaigns and sales person from Source." These examples of Sources are generalized, and the user may name a particular product by name.

Figure 4B:
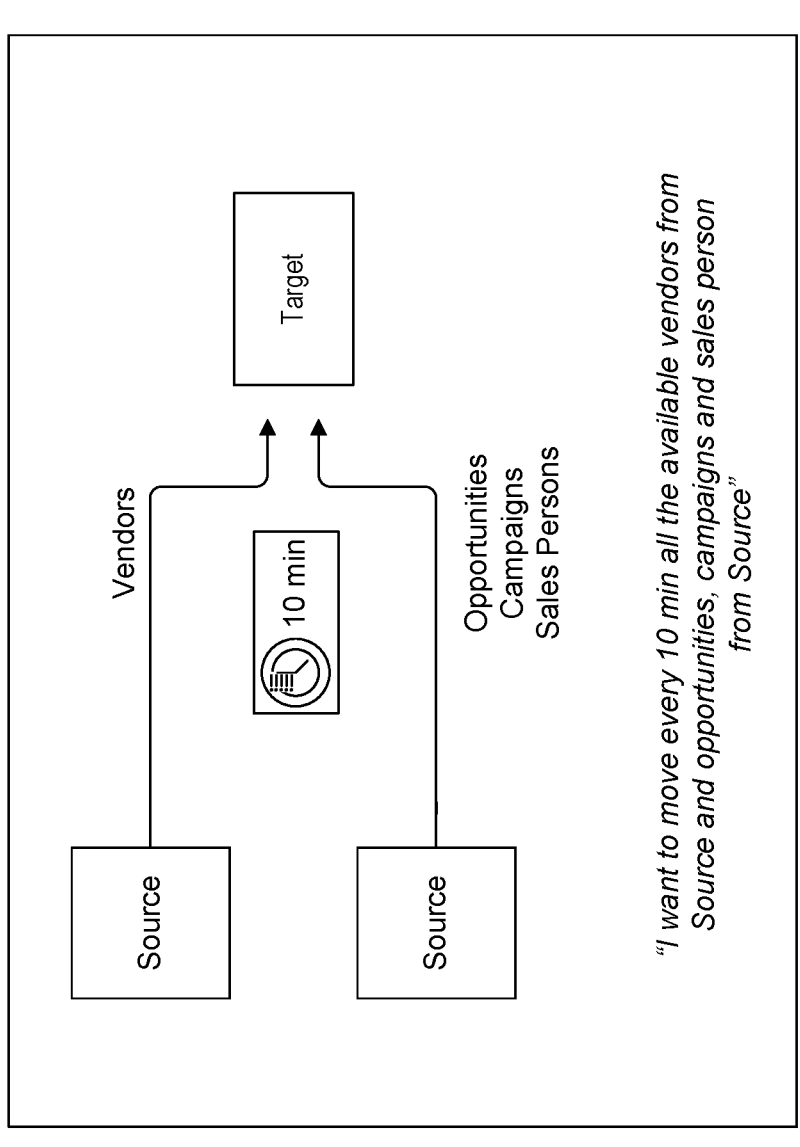

FIG. 4B is an example screen display 400B of a graphical representation of an automatically generated integration application, according to some embodiments. As illustrated in FIG. 4B, screen display 400B may include graphical representation 400B. The graphical representation in screen display 400B represents in graphical form an integration application based on a request of "I want to move every 10 min all the available vendors from Source and opportunities, campaigns and sales person from Source." These examples of Sources are generalized, and the user may name a particular product by name.

Figure 4C:
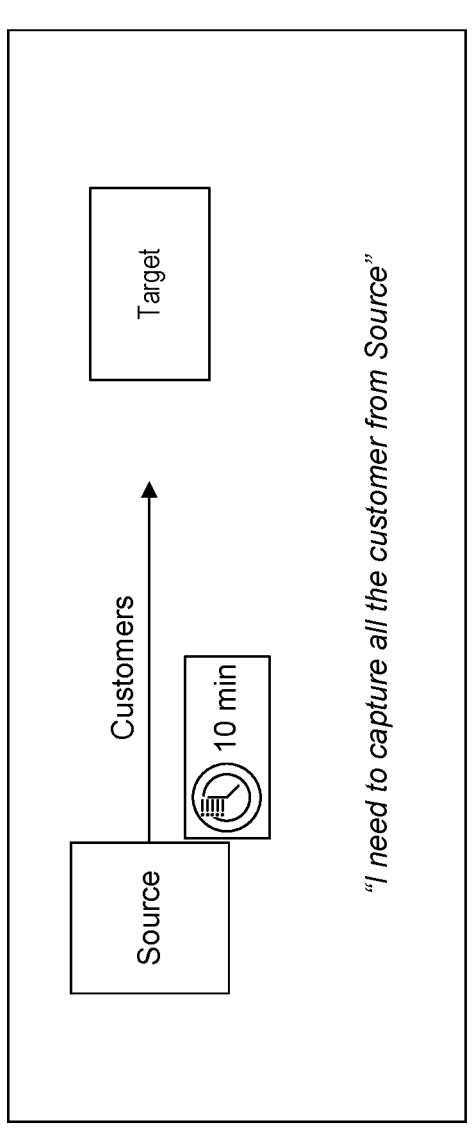

FIG. 4C is an example screen display 400C of a graphical representation of an automatically generated integration application, according to some embodiments. As illustrated in FIG. 4C, screen display 400C may include graphical representation 400C. The graphical representation in screen display 400C represents in graphical form an integration application based on a request of "I need to capture all the customer from Source." These examples of Sources are generalized, and the user may name a particular product by name.

Figure 5:
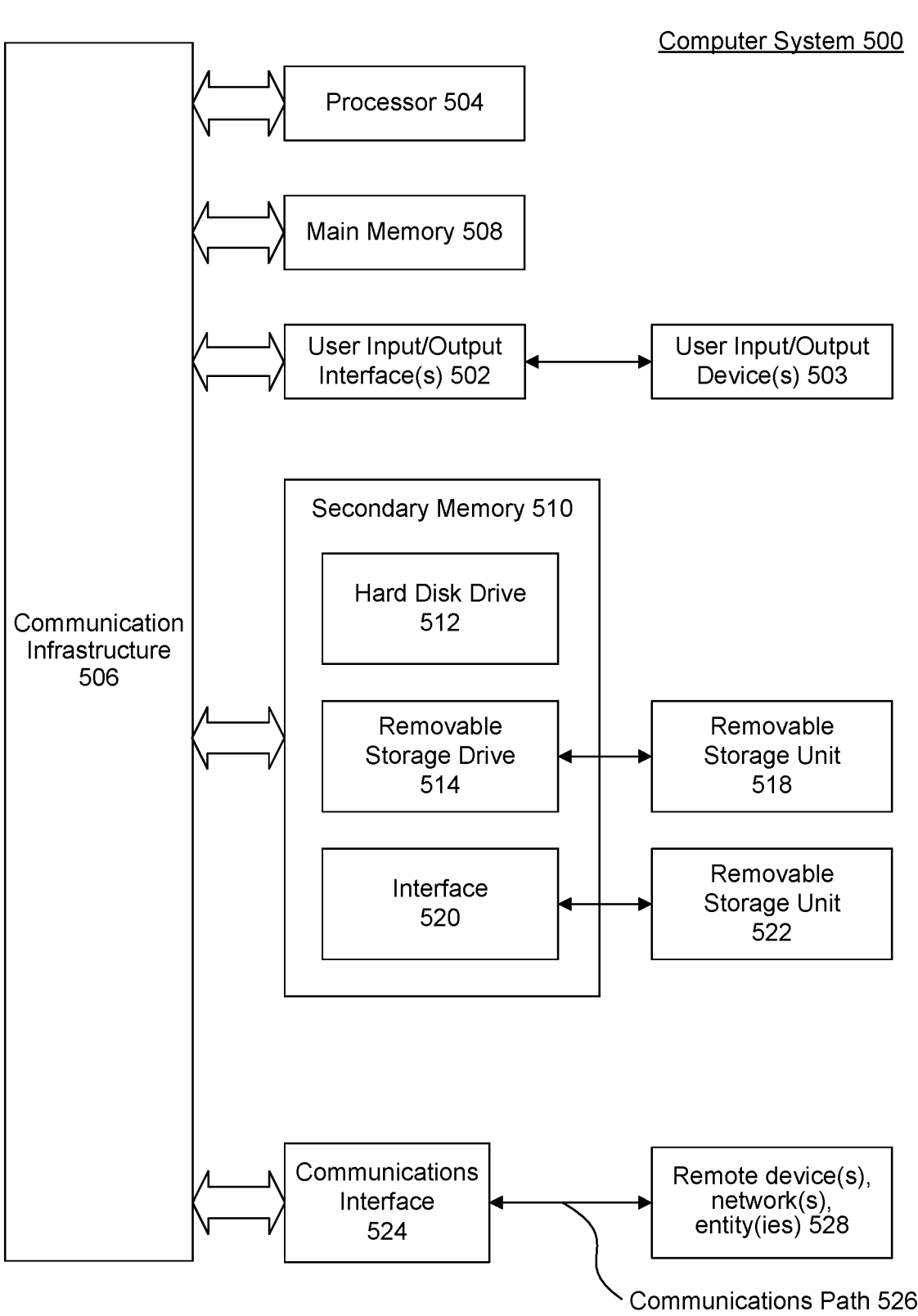
FIG. 5 illustrates a computer system, according to exemplary embodiments of the present disclosure.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
exposing a web service that receives a natural language input from a chat application;
tokenizing the natural language input to determine a source token, an entity token, and an operation token;
accessing an application programming interface ("API") catalog to map the source token to an API having an API specification defined in the API catalog;
determining an entity from the natural language input by accessing the API specification in the API catalog to map the entity token to the entity by comparing the entity token to one or more entities detailed in the API specification to determine a matching entity among the one or more entities using a phonetic algorithm, the entity accessible via the API;
in response to determining that the operation token does not match one or more operations detailed in the API specification, receiving additional information about the operation token in the chat application and determining an operation from the natural language input using the API specification and the additional information about the operation token;
generating, by one or more processing devices, an integration application that performs the operation on the entity at a source and sends a result to a target; and
deploying the integration application to an integration platform.

2. The method of claim 1, wherein the API specification adheres to an API description format, wherein the API description format is OpenAPI Specification (OAS) or RESTful API Modeling Language (RAML).

3. The method of claim 1, wherein the integration application comprises: (1) a first set of credentials to authenticate with and connect to the source, (2) a second set of credentials to authenticate with and connect to the target, (3) one or more calls to the API that perform the operation and reference the entity, and (4) an expression language script that transforms a result to a format required by the target.

4. The method of claim 1, further comprising:
generating a graphical representation of the integration application; and
causing a display of the graphical representation in the chat application.

5. The method of claim 1, further comprising:
determining that the source does not match a plurality of APIs detailed in the API catalog;
generating a request for additional information about the source; and
returning the request for additional information about the source to the chat application.

6. The method of claim 1, further comprising:
accessing the API catalog to retrieve the API specification for the API;
determining that the token entity does not match one or more entities detailed in the API specification;
generating a request for additional information about the token entity; and
returning the request for additional information about the token entity to the chat application.

7. The method of claim 1, the determining further comprising:
using a token analyzer service to parse the natural language input to build an abstract syntax tree.

8. The method of claim 1, wherein the natural language input further comprises a timing condition, and wherein the integration application performs the operation on the entity in the source and sends the result to the target at a regular interval in accordance with the timing condition.

9. A system, comprising:
a memory;
at least one processor coupled to the memory and configured to:
expose a web service that receives a natural language input from a chat application;
tokenize the natural language input to determine a source token, an entity token, and an operation token;

access an application programming interface ("API") catalog to map the source token to an API having an API specification defined in the API catalog;

determine an entity from the natural language input by accessing the API specification in the API catalog to map the entity token to the entity by comparing the entity token to one or more entities detailed in the API specification to determine a matching entity among the one or more entities using a phonetic algorithm, the entity accessible via the API;

in response to determining that the operation token does not match one or more operations detailed in the API specification, receive additional information about the operation token in the chat application and determine an operation from the natural language input using the API specification and the additional information about the operation token;

generate an integration application that performs the operation on the entity at a source and sends a result to a target; and deploy the integration application to an integration platform.

10. The system of claim 9, wherein the API specification adheres to an API description format, wherein the API description format is OpenAPI Specification (OAS) or RESTful API Modeling Language (RAML).

11. The system of claim 9, wherein the integration application comprises: (1) a first set of credentials to authenticate with and connect to the source, (2) a second set of credentials to authenticate with and connect to the target, (3) one or more calls to the API that perform the operation and reference the entity, and (4) an expression language script that transforms a result to a format required by the target.

12. The system of claim 9, the at least one processor further configured to:

generate a graphical representation of the integration application; and cause a display of the graphical representation in the chat application.

13. The system of claim 9, the at least one processor further configured to:

determine that the source does not match a plurality of APIs detailed in the API catalog;

generate a request for additional information about the source; and return the request for additional information about the source to the chat application.

14. The system of claim 9, the at least one processor further configured to:

use a token analyzer service to parse the natural language input to build an abstract syntax tree.

15. The system of claim 9, wherein the natural language input further comprises a timing condition, and wherein the integration application performs the operation on the entity in the source and sends the result to the target at a regular interval in accordance with the timing condition.

16. A non-transitory computer-readable device having instructions stored thereon that, when executed by at least one computing device, causes the at least one computing device to perform operations comprising:

exposing a web service that receives a natural language input from a chat application;

tokenizing the natural language input to determine a source token, an entity token, and an operation token;

accessing an application programming interface ("API") catalog to map the source token to an API having an API specification defined in the API catalog;

determining an entity from the natural language input by accessing the API specification in the API catalog to map the entity token to the entity by comparing the entity token to one or more entities detailed in the API specification to determine a matching entity among the one or more entities using a phonetic algorithm, the entity accessible via the API;

in response to determining that the operation token does not match one or more operations detailed in the API specification, receiving additional information about the operation token in the chat application and determining an operation from the natural language input using the API specification and the additional information about the operation token;

generating an integration application that performs the operation on the entity at a source and sends a result to a target; and deploying the integration application to an integration platform.

17. A non-transitory computer-readable device of claim 16, wherein the API specification adheres to an API description format, wherein the API description format is OpenAPI Specification (OAS) or RESTful API Modeling Language (RAML).

18. A non-transitory computer-readable device of claim 16, wherein the integration application comprises: (1) a first set of credentials to authenticate with and connect to the source, (2) a second set of credentials to authenticate with and connect to the target, (3) one or more calls to the API that perform the operation and reference the entity, and (4) an expression language script that transforms a result to a format required by the target.

19. A non-transitory computer-readable device of claim 16, the operations further comprising:

using a token analyzer service to parse the natural language input to build an abstract syntax tree.

20. A non-transitory computer-readable device of claim 16, wherein the natural language input further comprises a timing condition, and wherein the integration application performs the operation on the entity in the source and sends the result to the target at a regular interval in accordance with the timing condition.

* * * * *